(12) United States Patent
Mansingh et al.

(10) Patent No.: US 6,199,090 B1
(45) Date of Patent: Mar. 6, 2001

(54) DOUBLE INCREMENTING, LOW OVERHEAD, ADDER

(75) Inventors: Sanjay Mansingh, Santa Clara; Stephen Clark Purcell, Mountain View, both of CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/100,499

(22) Filed: Jun. 19, 1998

(51) Int. Cl.[7] .................................................. G06F 7/50
(52) U.S. Cl. ........................ 708/672; 708/703; 708/707; 708/713
(58) Field of Search ........................... 708/672, 700–703, 708/706–707, 710, 713

(56) References Cited

U.S. PATENT DOCUMENTS

| | | | | |
|---|---|---|---|---|
| 4,660,165 | * | 4/1987 | Masumoto | 708/712 |
| 5,027,310 | * | 6/1991 | Dalrymple | 708/672 |
| 5,504,698 | * | 4/1996 | Su | 708/672 |
| 5,555,517 | * | 9/1996 | Agrawal et al. | 708/672 |
| 5,586,070 | | 12/1996 | Purcell | 364/754 |
| 5,898,602 | * | 4/1999 | Rothman et al. | 708/707 |

* cited by examiner

*Primary Examiner*—Tan V. Mai
(74) *Attorney, Agent, or Firm*—Skjerven Morrill MacPherson LLP; Edward C. Kwok; Carmen C. Cook

(57) ABSTRACT

A double incrementing adder includes an AND gate configured to receive bits of the two input values of a common weight ("first weight"). The AND gate has an output terminal configured to carry the AND'ed bit. A three input XOR gate is configured to receive bits of the two input values of a common weight ("second weight") one bit more significant than the first weight. The three input XOR gate is configured to XOR these values with the AND'ed bit to generate a three input XOR'ed bit.

8 Claims, 5 Drawing Sheets

| INPUT VALUES | | | INTERMEDIATE VALUES | | | OUTPUT VALUES | |
|---|---|---|---|---|---|---|---|
| a[i] | b[i] | C[i-1] | g[i] | p[i] | t[i] | s[i] | C[i] |
| 0 | 0 | 0 | 0 | 0 | 0 | 0 | 0 |
| 0 | 0 | 1 | 0 | 0 | 0 | 1 | 0 |
| 0 | 1 | 0 | 0 | 1 | 0 | 1 | 0 |
| 0 | 1 | 1 | 0 | 1 | 1 | 0 | 1 |
| 1 | 0 | 0 | 0 | 1 | 0 | 1 | 0 |
| 1 | 0 | 1 | 0 | 1 | 1 | 0 | 1 |
| 1 | 1 | 0 | 1 | 0 | 0 | 0 | 1 |
| 1 | 1 | 1 | 1 | 0 | 0 | 1 | 1 |

| g[i-1] | a[i] | b[i] | C[i-1] | I[i-1] | p[i] | r[i] | t[i] | t'[i] | s[i] | g[i] | C[i] | I[i] |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 1 | 0 | 0 | 1 | 0 | 1 | 0 | 0 | 0 |
| 0 | 0 | 0 | 1 | 0 | 0 | 0 | 0 | 0 | 1 | 0 | 0 | 0 |
| 0 | 0 | 1 | 0 | 0 | 1 | 1 | 1 | 0 | 1 | 0 | 0 | 0 |
| 0 | 0 | 1 | 0 | 1 | 1 | 1 | 0 | 0 | 0 | 0 | 0 | 1 |
| 0 | 0 | 1 | 1 | 0 | 1 | 1 | 1 | 1 | 0 | 0 | 1 | 0 |
| 0 | 1 | 0 | 0 | 0 | 1 | 1 | 1 | 0 | 1 | 0 | 0 | 0 |
| 0 | 1 | 0 | 0 | 1 | 1 | 1 | 0 | 0 | 0 | 0 | 0 | 1 |
| 0 | 1 | 0 | 1 | 0 | 1 | 1 | 1 | 1 | 0 | 0 | 1 | 0 |
| 0 | 1 | 1 | 0 | 0 | 0 | 0 | 0 | 0 | 0 | 1 | 1 | 0 |
| 0 | 1 | 1 | 0 | 1 | 0 | 0 | 1 | 0 | 1 | 1 | 1 | 0 |
| 0 | 1 | 1 | 1 | 0 | 0 | 0 | 0 | 0 | 1 | 1 | 1 | 0 |
| 1 | 0 | 0 | 1 | 0 | 0 | 1 | 0 | 0 | 1 | 0 | 0 | 0 |
| 1 | 0 | 0 | 1 | 1 | 0 | 1 | 1 | 0 | 0 | 0 | 0 | 1 |
| 1 | 0 | 1 | 1 | 0 | 1 | 0 | 1 | 1 | 0 | 0 | 1 | 0 |
| 1 | 0 | 1 | 1 | 1 | 1 | 0 | 0 | 1 | 1 | 0 | 1 | 0 |
| 1 | 1 | 0 | 1 | 0 | 1 | 0 | 1 | 1 | 0 | 0 | 1 | 0 |
| 1 | 1 | 0 | 1 | 1 | 1 | 0 | 0 | 1 | 1 | 0 | 1 | 0 |
| 1 | 1 | 1 | 1 | 0 | 0 | 1 | 0 | 0 | 1 | 1 | 1 | 0 |
| 1 | 1 | 1 | 1 | 1 | 0 | 1 | 1 | 0 | 0 | 1 | 1 | 1 |

DOUBLE INCREMENTING, LOW OVERHEAD, ADDER

FIELD OF THE INVENTION

The present invention relates to adders, and more specifically, the present invention relates to an adder capable of adding two binary numbers and double incrementing.

BACKGROUND OF THE INVENTION

A common operation in a computer is the adding of one (n+1)-bit binary value a (a[n:0]) by another (n+1)-bit binary value b (b[n:0]). For example, an eight bit value a[7:0] may be added to another eight bit value b[7:0]. In one implementation, corresponding bits from the i'th column location are added together along with carry bits c[i−1] generated from the previous i−1'th column to form a sum bit s[i] for the i'th column and a carry bit c[i] used for the next i+1'th column. A typical addition operation is shown as follows:

| | |
|---|---|
| 1,1100,011 | (carry bits c [7:0]) |
| 1111,0001 | (bits a [7:0] = −15$_{10}$) |
| + 0110,1011 | (bits b [7:0] = 107$_{10}$) |
| 0101,1100 | (sum bits s [7:0] = 92$_{10}$) |

FIG. 1 shows a conventional column adder (adder 100) for adding the i'th bits (a[i] and b[i]) of values a[n:0] and b[n:0], for i equals any integer from 0 to n, inclusive. Column adder 100 has three input lines 102, 104 and 106 which carry signals respectively representing bit a[i] (the i'th bit of a[n:0]), bit b[i] (the i'th bit of b[n:0]), and carry bit c[i−1] (a carry bit from the next least significant i−1'th bit).

Lines 102 and 104 are input lines to an XOR gate (XOR 110) which has an output line 112 carrying a signal representing propagate bit p[i]. Lines 102 and 104 are also input lines to an AND gate (AND 120) which has output line 122 carrying a signal representing generate bit g[i]. Lines 106 and 112 are input lines to an XOR gate (XOR 130) and an AND gate (AND 140) which have respective output lines 132 and 142. Line 132 carries a signal representing the sum bit s[i] of the i'th bit column. Lines 122 and 142 are input lines for an OR gate (OR 150) which has output line 152 carrying a signal representing the carry bit c[i] generated by adding the i'th bit column.

FIG. 2 shows a truth table for column adder 100 which shows the three input bits a[i], b[i], and c[i−1] are added together to obtain a sum bit s[i] and a carry bit c[i]. For example, FIG. 2 shows that equations (1) and (2) are true.

$$\text{If } z[i]<2, \text{ then } s[i]=z[i] \text{ and } c[i]=0 \tag{1}$$

$$\text{If } z[i]\geq 2, \text{ then } s[i]=z[i]-2 \text{ and } c[i]=1 \tag{2}$$

where z[i] is the number of input values (a[i], b[i], or c[i−1]) which equal 1.

n column adders similar to column adder 100 are arrayed such that each adder produces a sum and carry bit associated with the corresponding bit column and outputs a carry value to the neighboring more significant column adder. The array of adders thus perform the addition of the following equation (3).

$$s=a+b \tag{3}$$

where
s is represented by bits s[n:0],
a is represented by bits a[n:0], and
b is represented by bits b[n:0].

When column 0 is being added (i=0), there is no carry value generated by the previous column i−1 because, by definition, there is no column −1. Conventionally, the input line 106 for column 0 has been used to increment the sum of a[n:0] and b[n:0] by w, which can be achieved by setting c[−1] equal to 1 or 0, as appropriate. Note that w is the weight of the least significant bit of a and b (e.g., w is 1 if a and b are integers). This allows the column adder 100 to perform both the addition and a single increment, as expressed in the following equation (4), to produce sum s.

$$s=a+b+w \tag{4}$$

For example, implementing equation (4), the above long-hand form would appear as follows:

| | |
|---|---|
| 1,1100,011 | (carry bits c [7:−1]) |
| 1111,0001 | (bits a [7:0] = −15$_{10}$) |
| + 0110,1011 | (bits b [7:0] = 107$_{10}$) |
| 0101,1100 | (sum bits s [7:0] = 93$_{10}$) |

However, some applications require performing both the addition and the double increment expressed in equation (5).

$$s=a+b+2w \tag{5}$$

A conventional way of accomplishing both addition and double increment (e.g., that of equation (5)) is to first perform both the addition and the single increment (e.g., that of equation (4)) using a single adder. Subsequently, an additional adder or incrementer increments the result from the first adder by w to complete the addition and double increment. However, this requires two adders or an adder and an incrementer which significantly increases the time and space needed to obtain the double incremented sum, compared to the time and space needed to obtain a single incremented sum.

Therefore, what is a faster way of obtaining a double incremented sum using less space.

SUMMARY OF THE INVENTION

In accordance with the present invention, an adder is provided for adding two input values. The adder includes an AND gate configured to receive bits of the two input values of a common weight ("first weight"). The AND gate has an output terminal configured to carry an AND'ed bit. A three input XOR gate is configured to receive bits of the two input values of a common weight ("second weight") one bit more significant than the first weight. The three input XOR gate is configured to XOR these values with the AND'ed bit to generate a three input XOR'ed bit.

In accordance with the present invention, a method is also provided. In the method, bits of the two input values of a common weight ("first weight") are logically AND'ed in an AND gate to generate an AND'ed bit. This AND'ed bit is logically XOR'ed, in a three input XOR gate, with bits of the two input values having a common weight ("second weight") one bit more significant than the first weight, thereby generating a three input XOR'ed bit.

In accordance with the present invention, a method includes providing an AND gate configured to receive bits of the two input values of a common weight ("first weight"). The AND gate has an output terminal configured to carry an AND'ed bit. The method also includes providing a three input XOR gate configured to receive bits of the two input values of a common weight ("second weight") one bit more significant than the first weight. The three input XOR gate is configured to XOR these values with the AND'ed bit to generate a three input XOR'ed bit.

The present invention allows for the addition of two values and double increment of the sum without using an extra adder or incrementer. Therefore, the present invention obtains a double incremented sum faster, and using less space, than conventionally known.

The present invention will be more fully understood in light of the following description and the accompanying claims.

DESCRIPTION OF THE INVENTION

Figures 1, 2:
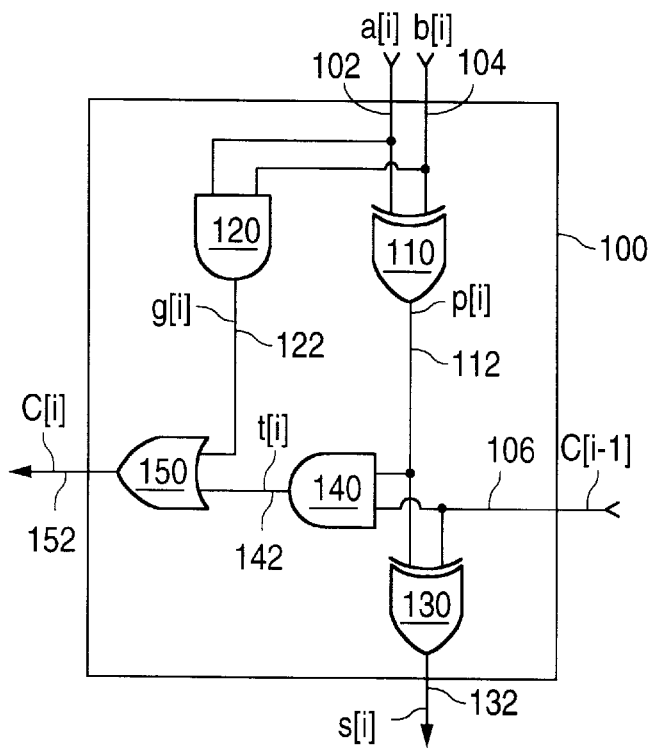
FIG. 1 shows one conventional column adder for adding the i'th bit of two multi-bit values.
FIG. 2 shows a truth table for the column adder of FIG. 1.
Figure 3A:
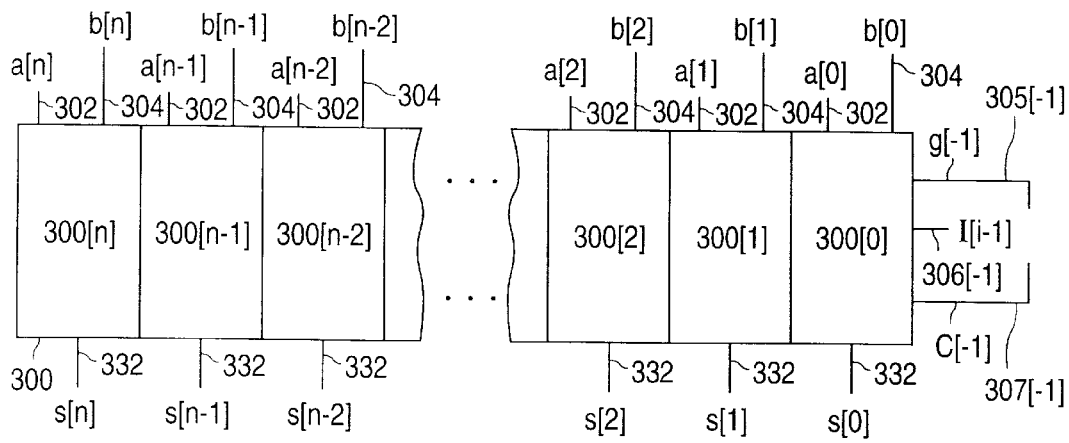
FIG. 3A shows an adder according to a first embodiment of the present invention.

FIG. 3A shows an adder 300 which includes n+1 column adders 300[n:0], of which, for clarity reasons, only column adders 300[n], 300[n-1], 300[n-2], 300[2], 300[1] and 300[0] are shown. Each column adder 300[i], for i equals 0 to n, is configured to add the i'th bits of first and second n-bit input values a and b responsive to the carry values from the previous column i-1.

Input bus 302 carries signals representing bits a[n:0] while input bus 304 carries signals representing bits b[n:0]. Input lines 306[-1] and 307[-1] carry respective signals I[-1] and C[-1] indicating increment select signals. For example, if two of I[-1] and C[-1] are high, adder 300 adds values a and b and double increments. If only one of I[-1] and C[-1] is high, adder 300 adds values a and b and single increments. Otherwise, adder 300 adds values a and b without incrementing. A generate value g[-1] (the same value as C[-1]) is input to adder 300 over line 305[-1]. Adder 300 outputs a sum represented by sum bits s[n:0] on bus 332[n:0] as described in detail below.

Figure 3B:
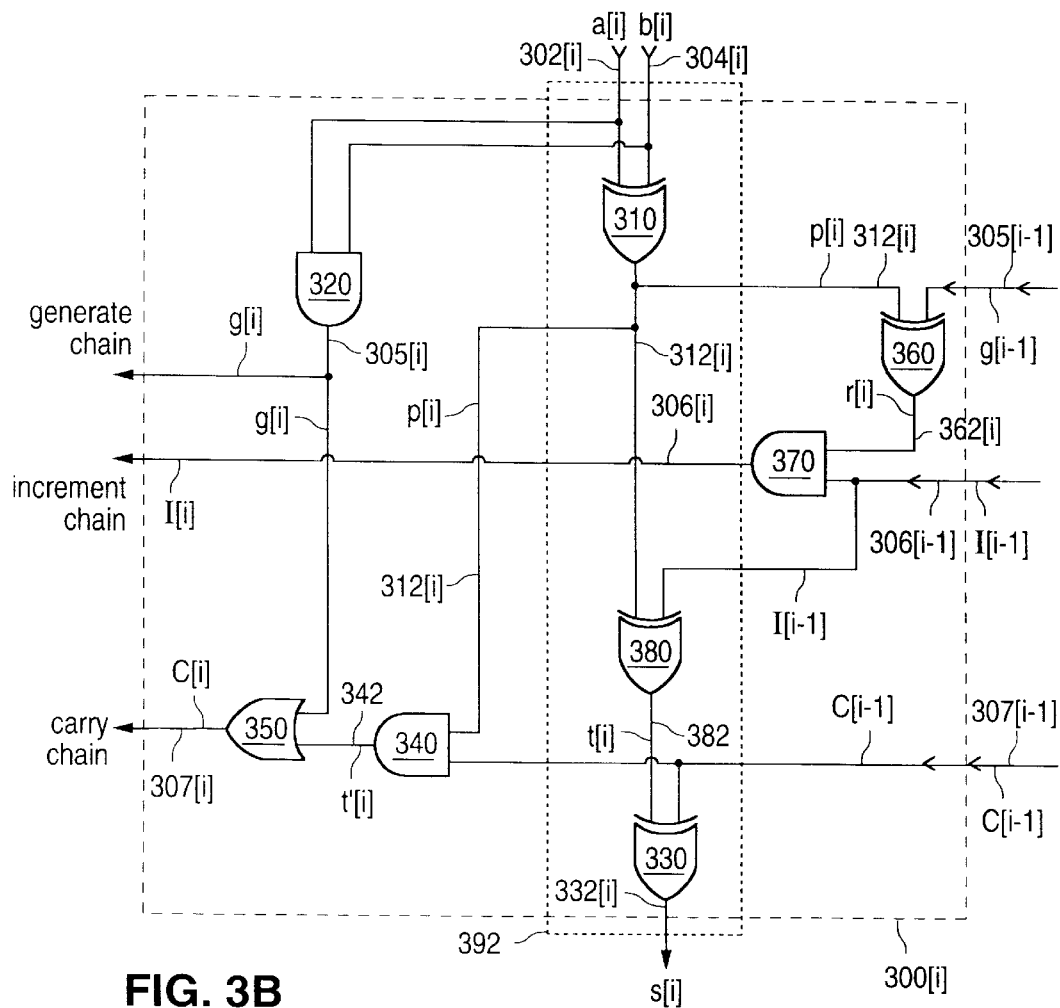
FIG. 3B shows a schematic diagram of a column adder of FIG. 3A for adding a column of bits from two values and selectively double incrementing.

FIG. 3B shows a schematic diagram of column adder 300[i] of FIG. 3A, for i equals 0 to n, for adding the i'th bits a[i] and b[i] and selectively double incrementing. Each column adder 300[i] may be similarly structured. Therefore, each element shown within column adder 300[i] represents elements in all column adders 300[n:0]. Column adder 300[i] has five input lines 302[i], 304[i], 305[i-1], 306[i-1] and 307[i-1] which carry signals representing respective bits a[i] (the i'th bit of a), b[i] (the i'th bit of b), g[i-1] (a "generate" bit from the previous i-1'th column), I[i-1] (an "increment" bit from the previous i-1'th column), and C[i-1] (a carry bit from the previous i-1'th column).

An XOR gate 310 receives its input values on lines 302[i] and 304[i] and provides a signal representing a propagate bit p[i] on output line 312[i]. Propagate bit p[i] is a trial sum of bits a[i] and b[i]. For example, if a[i] and b[i] are both 0 or both 1, the trial sum p[i] equals 0 while if only one of bits a[i] or b[i] is equal to 0, the trial sum p[i] equals 1.

The effective carry Y[i-1] from the previous column i-1 is represented by both bits C[i-1] and I[i-1] according to the following Table 1.

TABLE 1

| C [i-1] | I [i-1] | Y [i-1] |
|---|---|---|
| 0 | 0 | 0 |
| 0 | 1 | 1 |
| 1 | 0 | 1 |
| 1 | 1 | $10_2$ |

XOR gate 380 receives its input values on lines 312[i] and 306[i-1] and either inverts or passes the propagate bit p[i] as bit t[i] on output line 382 depending on whether bit I[i-1] is 1 or 0, respectively. Although XOR gates 310 and 380 are shown as two separate XOR gates, it will be recognized that a two input XOR gate having an output which acts as an input for a second XOR gate is equivalent to a three input XOR gate. For example, XOR gates 310 and 360 represent a three input XOR gate. XOR gate 330 receives its input values input values on lines 382 and 307[i-1] and inverts or passes the bit t[i] as sum bit s[i] on output line 332[i] depending on whether bit C[i-1] is 1 or 0, respectively. Therefore, the summing logic 392, defined by the dashed lines in FIG. 3B, operates according to the following truth Table 2.

TABLE 2

| C [i-1] | I [i-1] | carry Y [i-1] | s [i] |
|---|---|---|---|
| 0 | 0 | 0 | 0 if a [i] + b [i] = 0 or 2 |
| | | | 1 of a [i] + b [i] = 1 |
| 0 | 1 | 1 | 0 if a [i] + b [i] = 1 |
| | | | 1 if a [i] + b [i] = 0 or 2 |
| 1 | 0 | 1 | 0 if a [i] + b [i] = 1 |
| | | | 1 if a [i] + b [i] = 0 or 2 |
| 1 | 1 | $10_2$ | 0 if a [i] + b [i] = 0 or 2 |
| | | | 1 of a [i] + b [i] = 1 |

Table 2 shows that adder 300 produces an accurate sum bit s[i] responsive to the effective carry Y[i-1] from the previous column i-1.

The structure for generating the bits C[i], I[i] consistent with Tables 1 and 2 is next described. Three items noted from Tables 1 and 2 are, effective carry Y[i] from column i is (i) 0 when both bits C[i] and I[i] are 0, (ii) 1 when exactly one of C[i] or I[i] is 1, and (iii) two ($10_2$) when both C[i] and I[i] are 1. In other words, the effective carry Y[i] is the sum of bits C[i] and I[i].

A generate bit g[i-1], indicating whether both values of the previous column a[i-1] and b[i-1] are 1, is asserted on input line 305[i−1]. Lines 305[i−1] and 312[i] are input lines to XOR 360. XOR 360 provides, on output line 362[i], a relation bit r[i] which is 1 if a[i] and b[i] are different values while a[i−1] and b[i−1] are the same value, or if a[i] and b[i] are the same value while a[i−1] and b[i−1] are different values. Otherwise, r[i] is 0. For example, if a[i]=1, b[i]=1, a[i−1]=0, and b[i−1]=0, r[i] would be 0. However, if a[i]=0, b[i]=1, a[i−1]=0 and b[i−1]=0, r[i] would be 1. AND gate 320 receives its input values on input lines 302 and 304 and provides a generate bit g[i] on line 305[i] which is made available to column i+1 in a similar manner as g[i−1] is made available to column i, thereby forming a generate chain. The generate chain interacts with the increment and carry chain (described below) to ensure that adder 300 operates according to truth tables of Tables 1 and 2.

The increment chain of adder 300 is next described. AND gate 370 receives its input values on lines 306[i−1] and 362[i] and outputs the next increment bit I[i] on line 306[i]. This increment bit I[i] is made available to the next column i+1 on line 306[i] in a similar manner as increment bit I[i−1] is made available on line 306[i−1] to column i, thereby forming an increment chain in which the increment bits ripple from least significant to most significant. Alternatively, an increment look-ahead tree structure is used to generate all increment values I[n−1:−1] substantially simultaneously as described with reference to FIGS. 5 and 8.

The carry chain of adder 300 is next described. An AND gate 340 receives its input values on lines 307[i−1] and 312[i] and outputs bit t'[i] on line 342, which bit t'[i] is 1 if exactly one of a[i] or b[i] is 1 and carry bit C[i−1] is 1. Otherwise, t'[i] is 0. An OR gate 350 receives its input values on lines 342 and 305[i] and outputs bit C[i] on line 307[i] which is made available to the next column i+1 in a similar manner as bit C[i−1] is made available to column i on line 307[i−1], thereby forming a carry chain. Alternatively, a carry look-ahead tree structure is used to generate all carry values C[n:0] substantially simultaneously as described with reference to FIGS. 5–7.

Figures 4, 7:
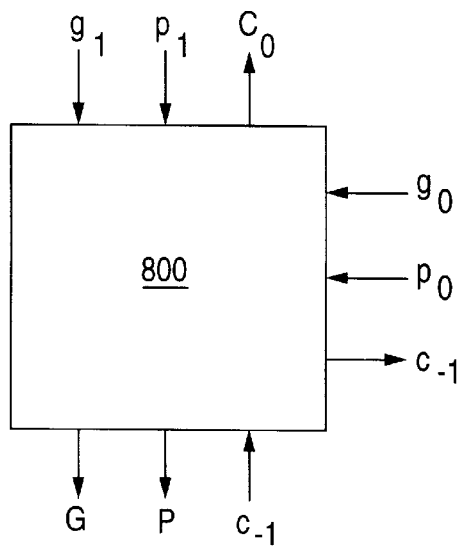
FIG. 4 shows a truth table for all column adders of FIGS. 3A and 3B.
FIG. 7 shows one stage unit of the tree of FIG. 6.

FIG. 4 shows a truth table for column adder 300[i] which shows all possible configurations of input values g[i−1], a[i], b[i], C[i−1], and I[i−1]. Note that g[i−1] equals C[i−1] when i is 0. Also note that C[i] equaling 0 and g[i] equaling 1 is not allowed. Since g[−1] equals C[−1], the only possible combinations of g[−1], C[−1] and I[−1] are 000, 001, 110 and 111. For each subsequent column adder 300[n:1], the only possible combinations of g[i], C[i] and I[i], are 000, 001, 010, 110 and 111, which limits the number of input permutations for the next column i+1.

Considering the truth table of FIG. 4, column adder 300[i] is configured to sum values for each column responsive to the carry values from the previous column and generate carry values for the next column as shown in equation (6).

$$a[i]+b[i]+Y[i-1]=2*Y[i]+S[i] \quad (6)$$

Therefore, adder 300 selectively double increments a sum using a single adder when both logic values I[−1] and C[−1] are high, thereby increasing the speed and reducing the space required for double incrementing a sum, as compared to the conventional structures and methods. Note that adder 300 is also capable of single incrementing by setting only one of logic values I[−1] or C[−1] high. Selectively not incrementing is also possible by setting both logic values I[−1] and C[−1] low.

The present structure and method has the advantage of having a fast ripple effect for the increment chain because AND 370 has a relatively short response time. However, the critical path in adder 300 is the ripple speed of the carry chain of adder 300.

Figure 5:
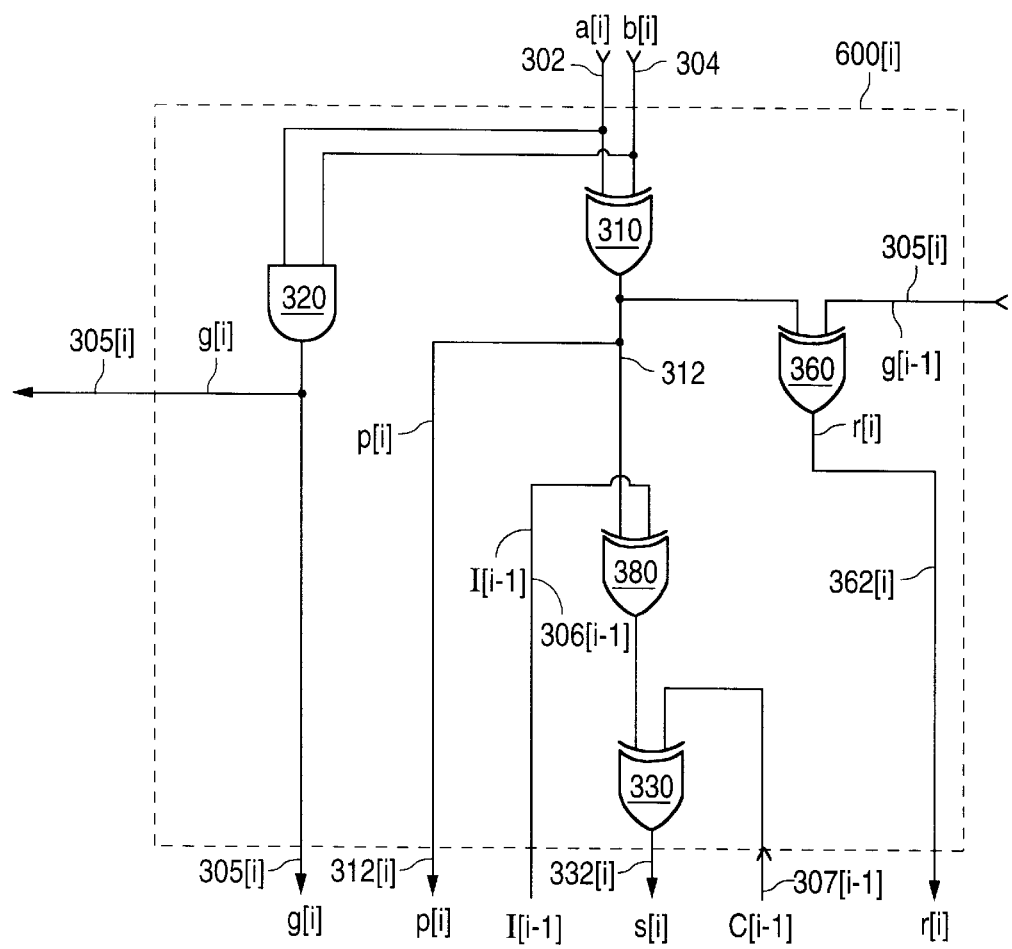
FIG. 5 shows the i'th column of a column adder according to a second embodiment of the present

FIG. 5 is a schematic diagram of the i'th column of adder 600 (column adder 600[i]) which is similar to column adder 300[i] except that the carry and increment values C[n−1:−1] and I[n−1:−1] are generated in a tree structure, and not in a ripple chain. Specifically, OR gate 350, AND gate 340 and AND gate 370 are absent with lines 305[i] and 312[i] carrying signals representing bits g[i] and p[i], respectively, are fed out of adder 600 to a carry tree structure (FIG. 6) described hereinafter. Bit C[i−1] of line 307[i−1] is received from the carry tree structure of FIG. 6 and not from the neighboring less significant column i−1. Also, line 362[i] carrying a signal representing relation bit r[i] is fed out of adder 600 to an increment tree structure (FIG. 8) described hereinafter. Bit I[i−1] of line 306[i−1] is receive from the increment look-ahead tree structure of FIG. 8 and not from the neighboring column i−1.

Figure 6:
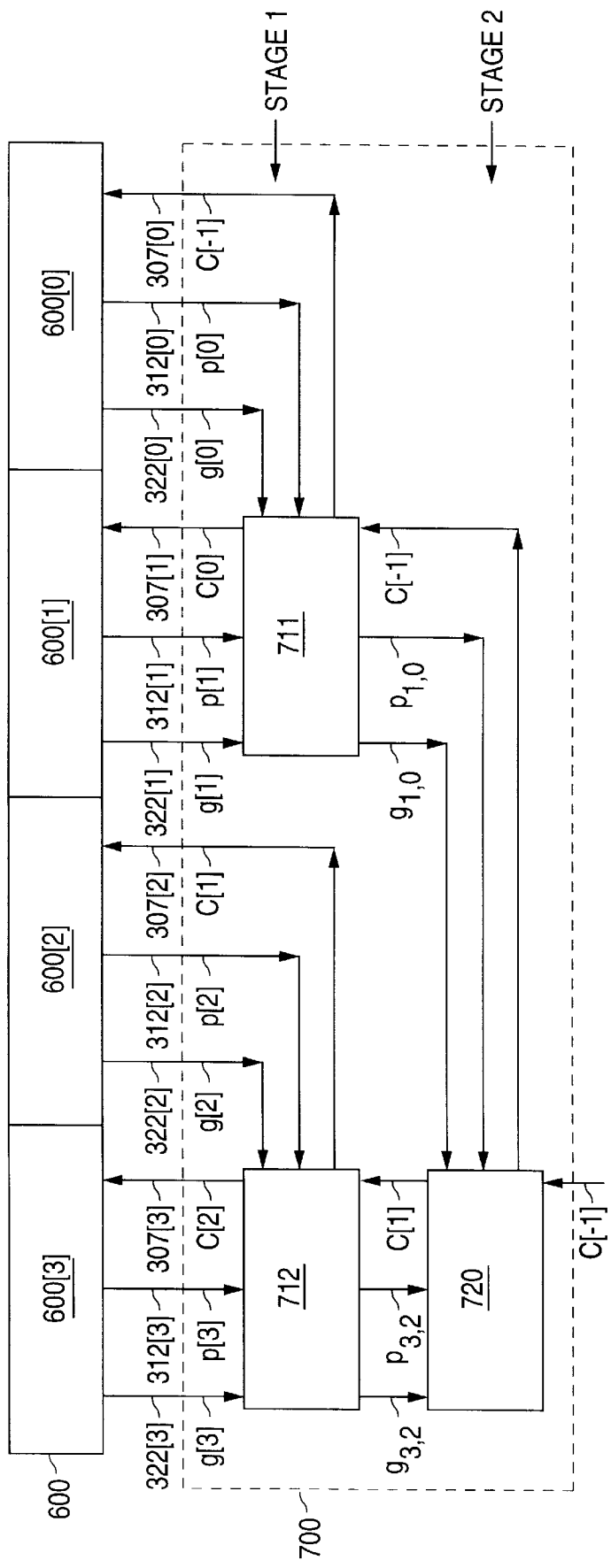
FIG. 6 shows an adder comprising the column adders of FIG. 5 with an accompanying carry look-ahead tree structure.

FIG. 6 shows adder 600 with an accompanying carry look-ahead tree 700 which is configured to compute bits C[2:−1] from the generate and propagate bits g[3:0] and p[3:0] for all columns and from the initial carry bit C[−1]. Adder 600 is structurally similar to adder 300 except that adder 600 is composed of column adders 600[0], 600[1], 600[2], and 600[3] (n=3). For clarity, the lines carrying bits s[3:0], a[3:0], b[3:0] are not shown.

A carry look-ahead tree 700 has $\log_2(n+1)$ rounded up numbers of stages. For example, tree 700 has 2 stages to accommodate four bit adders but would require 3 stages to accommodate a fifth bit adder. The generate and propagate bits flow generally downward and the carry bits flow generally upwards.

Stage 1 unit 711 is configured to receive bits g[0], p[0], g[1], and p[1] and assert bits $g_{10}$ and $p_{10}$ while stage 1 unit 712 is configured to receive bits g[2], p[2], g[3], and p[3] and assert bits $g_{32}$ and $p_{32}$ to stage 2 unit 720.

Stage 2 unit 720 is configured to receive bit C[−1] and assert bit C[−1] unaltered to stage 1 unit 711 and assert bit C[1] to stage 1 unit 712. Stage 1 unit 711 receives bit C[−1] and asserts bit C[−1] unaltered over line 307 to column adder 600[0] and asserts bit C[0] to column adder 600[1]. Similarly, stage 1 unit 712 receives bit C[1] and asserts bit C[1] unaltered to column adder 600[2] and asserts bit C[2] to column adder 600[3]. It would be apparent that the tree structure can be deepened for larger bit adders.

FIG. 7 represents one stage unit 800 and may be any one of units 711, 712, or 720. Stage unit 800 receives signals $g_0$, $p_0$, $g_1$, and $p_1$ and outputs signals G and P which correspond to, for example, stage 1 unit 712 receiving signals g[2], p[2], g[3], and p[3] and outputting signals $g_{32}$ and $p_{32}$. Stage unit 800 receives carry signal $c_{-1}$ and outputs signal $c_{-1}$ and signal $C_0$ which corresponds to, for example, stage one unit 712 receiving signal C[1] and outputting signal C[1] and C[2]. The operations performed by stage unit 800 are defined by equations (7) to (10).

$$G=(g_0 \text{ AND } P_1) \text{ OR } g_1 \quad (7)$$

$$P=p_0 \text{ AND } P_1 \quad (8)$$

$$C_{-1}=C_{-1} \quad (9)$$

$$C_0=(c_{-1} \text{ AND } p_0) \text{ OR } g_0 \quad (10)$$

Therefore, bits C[n:0] are, in one embodiment, determined by using a carry look-ahead tree structure.

Figure 8:
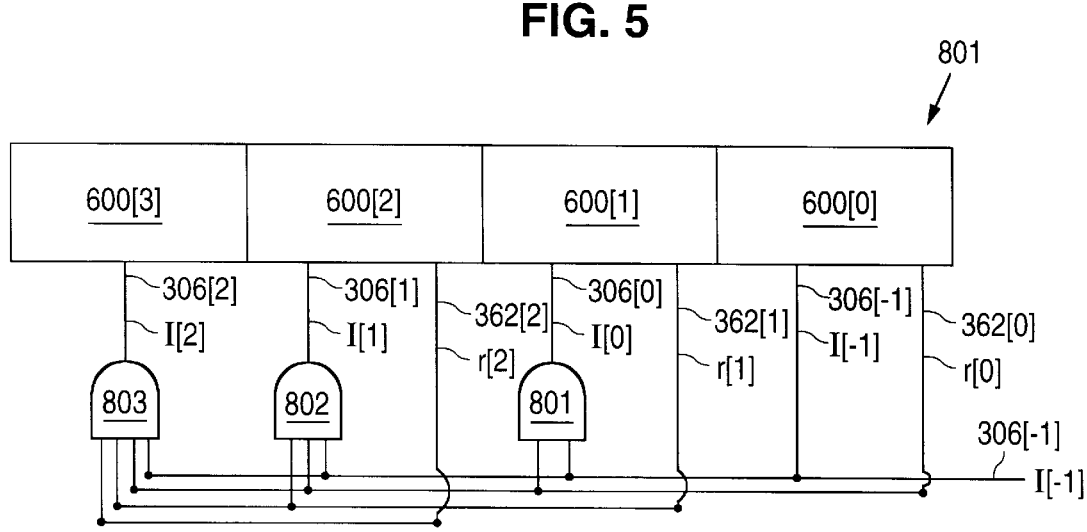
FIG. 8 shows an adder comprising the column adders of FIG. 5 with an accompanying increment look-ahead tree structure.

FIG. 8 shows adder 600 with an accompanying increment look-ahead tree 801 which is configured to compute bits I[2:−1] from the relations bits r[3:0] and from the initial increment bit I[−1]. The I[i] value is the logical AND of all less significant relation bits r[i−1:0] and the initial increment value I[−1], which can be determined by the increment look-ahead tree 801 also as quickly as the above carry tree structure.

Increment look-ahead tree includes AND gates 801, 802 and 803 corresponding to each column 1, 2 and 3. Column adder 600[0] receives initial increment bit I[−1] on line 306[−1]. AND gate 801 receives and AND's relation bit r[0] from line 362[0] and initial increment bit I[−1] from line 306[−1], and generates an increment bit I[0] onto line 306[0] to column adder 600[1]. AND gate 802 receives and AND's relation bits r[1:0] from bus 362[1:0] and initial increment bit I[−1] from line 306[−1], and generates an increment bit I[1] onto line 306[1] to column adder 600[2]. AND gate 803 receives and AND's relation bits r[2:0] from bus 362[2:0] and initial increment bit I[−1] from line 306[−1], and generates an increment bit I[2] onto line 306[2] to column adder 600[3].

Therefore, a low overhead adder is provided which also selectively double increments.

Throughout this description and in the claims, an AND gate, an OR gate, and an XOR gate, are defined as any circuit which generates a value on its output terminal which represents the logical AND, OR, and XOR, respectively, of the values on its input terminals.

Although the principles of the present invention have been described with reference to specific embodiments, these embodiments are illustrative only and not limiting. Many other applications and embodiments of the principles of the present invention will be apparent in light of this disclosure and the following claims.

We claim:

1. An adder for adding first and second values, said adder comprising:

a first AND gate having first and second input terminals configured to receive respective bits of said first and second values of a first weight, said first AND gate having an output terminal configured to carry a generate bit;

a first XOR gate having first and second input terminals, said first and second input terminals configured to receive respective bits of said first and second values of said first weight, said first XOR gate having an output terminal configured to carry a first output bit;

a second XOR gate having first and second input terminals, said first input terminals configured to receive said first output bit, said second input terminal configured to receive an increment bit of a second weight being one bit less significant than said first weight, said second XOR gate having an output terminal configured to carry a second output bit;

a third XOR gate having first and second input terminals, said first terminal configured to receive said second output bit, said second terminal configured to receive a carry bit of said second weight, said third XOR gate having an output terminal configured to carry a sum bit of said first weight;

a second AND gate having a first input terminal configured to receive said first output bit, a second input terminal configured to receive said carry bit of said second weight, and an output terminal configured to carry a second AND'ed bit; and an OR gate having a first in put terminal configured to receive said generate bit, a second input terminal coupled to receive said second AND'ed bit, and an output terminal configured to carry a carry bit of said first weight.

2. The adder of claim 1, further comprising:

a third AND gate having first and second input terminals configured to receive respective bits of said first and second values of a third weight being one bit less significant than said second weight, said third AND gate having an output terminal configured to carry a generate bit of said third weight;

a fourth XOR gate having a first, second and third input terminals, said first and second input terminals configured to receive respective bits of said first and second values of said second weight, said third input terminal configured to receive said generate bit of said third weight, said fourth XOR gate having an output terminal configured to carry a relation bit of said second weight; and a fourth AND gate having a first input terminal configured to receive said relation bit of said second weight, and a second input terminal configured to receive an increment bit of said third weight, and an output terminal configured to carry said increment bit of said second weight.

3. The adder of claim 2, wherein said increment bit of said third weight is a preselected value when said bits of said first and second values of said third weight is the least significant bit of said first and second values.

4. The adder of claim 2, wherein said carry bit of said second weight is a preselected value when said bits of said first and second values of said second weight is the least significant bit of said first and second values.

5. A method of adding a first and second value, comprising:

logically AND'ing bits of said first and second values of a first weight in a first AND gate, thereby generating a generate bit;

logically XOR'ing bits of said first and second values of said first weight in a first XOR gate, thereby generating a first output bit;

logically XOR'ing said first output bit and an increment bit of a second weight being one bit less significant than said first weight, thereby generating a second output bit;

logically XOR'ing said second output bit and a carry bit of said second weight, thereby generating a sum bit of said first weight;

logically AND'ing said first output bit and said carry bit of said second weight, thereby generating a second AND'ed bit; and logically OR'ing said generate bit and said second AND'ed bit, thereby generating a carry bit of said first weight.

6. The method of claim 5, further comprising:

logically AND'ing bits of said first and second values of a third weight being one bit less significant than said second weight, thereby generating a generate bit of said third weight;

logically XOR'ing bits of said first and second values of said second weight and said generate bit of said third weight, thereby generating a relation bit of said second weight; and logically AND'ing said relation bit of said second weight and an increment bit of said third weight, thereby generating said increment bit of said second weight.

7. The method of claim 6, wherein said increment bit of said third weight is a preselected value when said bits of said first and second values of said third weight is the least significant bit of said first and second values.

8. The adder of claim 6, wherein said carry bit of said second weight is a preselected value when said bits of said first and second values of said second weight is the least significant bit of said first and second values.

* * * * *